United States Patent
Bashir et al.

(10) Patent No.: US 9,556,540 B2
(45) Date of Patent: Jan. 31, 2017

(54) PROCESS FOR MAKING OPAQUE POLYESTER FILM

(75) Inventors: Zahir Bashir, Riyadh (SA); Ian MacMillan Ward, Leeds (GB); Glen Peter Thompson, Bradford (GB); Anthony Paul Unwin, Leeds (GB)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 553 days.

(21) Appl. No.: 12/988,737

(22) PCT Filed: Apr. 20, 2009

(86) PCT No.: PCT/EP2009/002986
§ 371 (c)(1),
(2), (4) Date: Dec. 21, 2010

(87) PCT Pub. No.: WO2009/130033
PCT Pub. Date: Oct. 29, 2009

(65) Prior Publication Data
US 2011/0097524 A1 Apr. 28, 2011

(30) Foreign Application Priority Data
Apr. 24, 2008 (EP) .................................... 08007913

(51) Int. Cl.
*B29C 47/00* (2006.01)
*B29C 47/88* (2006.01)
(Continued)

(52) U.S. Cl.
CPC .. *D01F 6/62* (2013.01); *C08J 5/18* (2013.01); *D01D 5/426* (2013.01);
(Continued)

(58) Field of Classification Search
CPC ............. B29C 47/0004; B29C 47/0021; B29C 47/0057;B29C 47/043; B29C 47/88; B29C 47/8805; B29C 47/8815; B29C 47/8845; B29C 47/884; B29C 47/92; B29C 2947/92742; B29C 2947/92752; B29C 2947/9278; B29C 55/12; B29C 55/14; B29C 55/143; B29C 2071/022; B29C 71/02; B29K 2067/00; B29K 2067/003; D01F 6/62; D01D 5/426; C08J 5/18; C08J 2367/02; Y10T 442/30; Y10T 428/1345

See application file for complete search history.

(56) References Cited

U.S. PATENT DOCUMENTS 3,179,326 A * 4/1965 Underwood et al. .......... 229/203
3,640,944 A * 2/1972 Seppalla et al. ............... 523/508
(Continued)

FOREIGN PATENT DOCUMENTS

DE 102005058908 * 6/2007
EP 0300060 A1 1/1989
(Continued)

OTHER PUBLICATIONS

Bashir et al.; "Evaluation of Three Methods for the Measurement of Crystallinity of PET Resins, Performs, and Bottles"; Polymer Engineering and Science; vol. 40, No. 11; Nov. 2000; pp. 2442-2455.
(Continued)

*Primary Examiner* — Jeffrey Wollschlager
(74) *Attorney, Agent, or Firm* — Cantor Colburn LLP

(57) ABSTRACT

The invention relates to a process for making an opaque and glossy film from a thermoplastic polyester composition, comprising the steps of a) extruding the polyester composition through a slot die, and quenching to form a substantially amorphous film having a crystallinity of at most 5%;
(Continued)

b) rapidly heating the amorphous film to a drawing temperature in the range from $T_g$ to $(T_g+50)°$ C. while applying a draw ratio in the range of from $\lambda_{initiation}$ to $\lambda_{max.}$ in longitudinal direction, and a drawing rate of at least 1 m/min to form an oriented film showing stress-whitening, wherein $\lambda_{initiation}$ is the draw ratio at which a transfer from a transparent product to a stress-whitened product occurs and $\lambda_{max.}$ is the draw ratio at which failure of the stress whitened film occurs; and c) heat-setting the oriented stress-whitened film; the thermoplastic polyester composition substantially consisting of at least one crystallizable polyester derived from at least one aliphatic diol and at least one aromatic dicarboxylic acid.

With this process it is possible to make a unitary, glossy, opaque film from a polyester composition that does not contain void-forming additives like high amounts of fine pigment particles or dispersed non-miscible polymer particles. The film obtained also has very good mechanical properties. It is a further advantage that the process can be performed continuously on conventional extrusion and stretching equipment used for making transparent film from polyesters.

The invention also relates to an opaque polyester film obtainable by said process.

10 Claims, 2 Drawing Sheets

(51) Int. Cl.
    B29C 47/92    (2006.01)
    B29C 55/06    (2006.01)
    D01F 6/62     (2006.01)
    C08J 5/18     (2006.01)
    D01D 5/42     (2006.01)
    B29C 47/04    (2006.01)
    B29K 67/00    (2006.01)
    B29C 71/02    (2006.01)
    B29C 55/14    (2006.01)
    B29C 55/12    (2006.01)

(52) U.S. Cl.
    CPC ...... B29C 47/0004 (2013.01); B29C 47/0021 (2013.01); B29C 47/0057 (2013.01); B29C 47/043 (2013.01); B29C 47/88 (2013.01); B29C 47/884 (2013.01); B29C 47/8805 (2013.01); B29C 47/8815 (2013.01); B29C 47/8845 (2013.01); B29C 47/92 (2013.01); B29C 55/06 (2013.01); B29C 55/12 (2013.01); B29C 55/14 (2013.01); B29C 55/143 (2013.01); B29C 71/02 (2013.01); B29C 2071/022 (2013.01); B29C 2947/9278 (2013.01); B29C 2947/92742 (2013.01); B29C 2947/92752 (2013.01); B29K 2067/00 (2013.01); B29K 2067/003 (2013.01); C08J 2367/02 (2013.01); Y10T 428/1345 (2015.01); Y10T 442/30 (2015.04)

(56) References Cited

U.S. PATENT DOCUMENTS

| | | | | |
|---|---|---|---|---|
| 3,843,761 A | * | 10/1974 | Bierenbaum et al. | 264/154 |
| 3,944,699 A | * | 3/1976 | Mathews et al. | 428/220 |
| 4,116,892 A | * | 9/1978 | Schwarz | 521/62 |
| 4,764,320 A | * | 8/1988 | Chau et al. | 264/41 |
| 4,780,402 A | | 10/1988 | Remmington | |
| 5,422,175 A | | 6/1995 | Ito et al. | |
| 5,514,460 A | * | 5/1996 | Surman et al. | 428/304.4 |
| 5,672,409 A | * | 9/1997 | Miyakawa et al. | 428/141 |
| 6,124,029 A | | 9/2000 | Schreck et al. | |
| 6,641,924 B1 | * | 11/2003 | Peiffer et al. | 428/480 |
| 6,855,400 B1 | * | 2/2005 | Andreis et al. | 428/212 |
| 6,939,600 B2 | * | 9/2005 | Murschall et al. | 428/212 |
| 7,238,419 B2 | * | 7/2007 | Kern et al. | 428/328 |
| 2003/0017317 A1 | * | 1/2003 | Murschall et al. | 428/220 |
| 2003/0105446 A1 | * | 6/2003 | Hutson et al. | 604/385.22 |
| 2004/0026827 A1 | * | 2/2004 | Dairanieh et al. | 264/288.4 |
| 2004/0058604 A1 | | 3/2004 | Jud et al. | |
| 2005/0112296 A1 | * | 5/2005 | Laney et al. | 428/1.1 |
| 2006/0073318 A1 | * | 4/2006 | Tuttle et al. | 428/220 |
| 2008/0251181 A1 | * | 10/2008 | Quintens et al. | 156/60 |
| 2011/0135221 A1 | | 6/2011 | Bashir et al. | |
| 2012/0107527 A1 | | 5/2012 | Auffermann | |

FOREIGN PATENT DOCUMENTS

| | | |
|---|---|---|
| EP | 0451797 A2 | 10/1991 |
| EP | 0496323 A2 | 7/1992 |
| EP | 0924050 A2 | 6/1999 |
| EP | 1279755 A2 | 1/2003 |
| EP | 1627894 A1 | 2/2006 |
| GB | 609797 A | 10/1948 |
| GB | 1307177 A | 2/1973 |
| GB | 1521579 | 8/1978 |
| GB | 1591091 A | 6/1981 |
| GB | 1602726 | 11/1981 |
| JP | 64020312 A | 1/1989 |
| JP | 07310231 A | 11/1995 |
| WO | WO2008040670 * | 4/2008 |

OTHER PUBLICATIONS

De et al.; "The Crystal Structure of Polyethylene Terephthalate"; Proceedings of the Royal Society of London; Series A: Mathematical and Physical Sciences; vol. 226; Dec. 7, 1954; 13 Pages.

Fakirov et al.; "Unit Cell Dimensions of Poly(ethylene terephthalate)"; Die Makromolekulare Chemie; vol. 176; 1975; 8 Pages.

Jabarin; "Optical Properties of Thermally Crystallized Poly(ethylene terephthalate)"; Polymer Engineering and Science; vol. 22, No. 13; Sep. 1982; 8 Pages.

Rule; Physical Constants of Poly(oxyethylene-oxyterephthaloyl) (Poly(ethylene terephthalate)); Polymer Handbook; Fourth Edition; Chapter 5; Published: John Wiley; Editors: J. Bandrup, E.M. Immergut, and E. A. Grulke; 1975; pp. 113-118.

Japanese Patent No. 07310231 (A); Publication Date: Nov. 28, 1995; Abstract Only; 1 Page.

Japanese Patent No. 64020310 (A); Publication Date: Jan. 24, 1983; Abstract Only; 1 Page.

Extended European Search Report; European Application No. 080079130.2; Date of Mailing: Aug. 15, 2008; 5 Pages.

Olsson et al.; "Packaging, Containers for Industrial Materials"; Kirk-Othmer Encyclopedia of Chemical Technology; Published Online: Jun. 17, 2005; 7 Pages.

International Search Report; International Application No. PCT/EP2009/002986; International Filing Date: Jul. 6, 2009; Date of Mailing: Jul. 6, 2009; 6 Pages.

Written Opinion of the International Searching Authority; International Application No. PCT/EP2009/002986; International Filing Date: Apr. 20, 2009; Date of Mailing: Jul. 6, 2009; 6 Pages.

Chandran, Prashant et al.; Biaxial Orientation of Poly(ethylene Terephthalate);Adv Polymer Tech, vol. 12, No. 2, 133-151 (1993).

* cited by examiner

PROCESS FOR MAKING OPAQUE POLYESTER FILM

The invention relates to a process for making an opaque film from a thermoplastic polyester composition, comprising the steps of
- a) extruding the polyester composition through a slot die, and quenching to form a substantially amorphous film;
- b) heating the amorphous film while applying a draw ratio in the longitudinal direction to form an oriented film;
- c) heat-setting the oriented film.

The invention also relates to an opaque polyester film obtainable by the process according to the invention and to uses of such film.

Such a process is known from patent publication U.S. Pat. No. 4,780,402. In this document a process is described wherein a white, opaque film is made from a polyethylene terephthalate (PET) composition containing 5-25 mass % of dispersed barium sulphate particles of average size in the range 0.5-5 µm, the process comprising the steps of
- a) melt extruding the PET composition through a slot die, and quenching on a rotating cooled drum to form a substantially amorphous film;
- b) heating the amorphous film to about 90° C. while applying a draw ratio of 3.0-4.2 in longitudinal direction (also called machine direction), followed by applying a draw ratio of 3.0-4.2 in transverse direction to form a bi-axially oriented film;
- c) heat-setting the oriented film at about 210° C.

DETAILED DESCRIPTION

Figure 1:
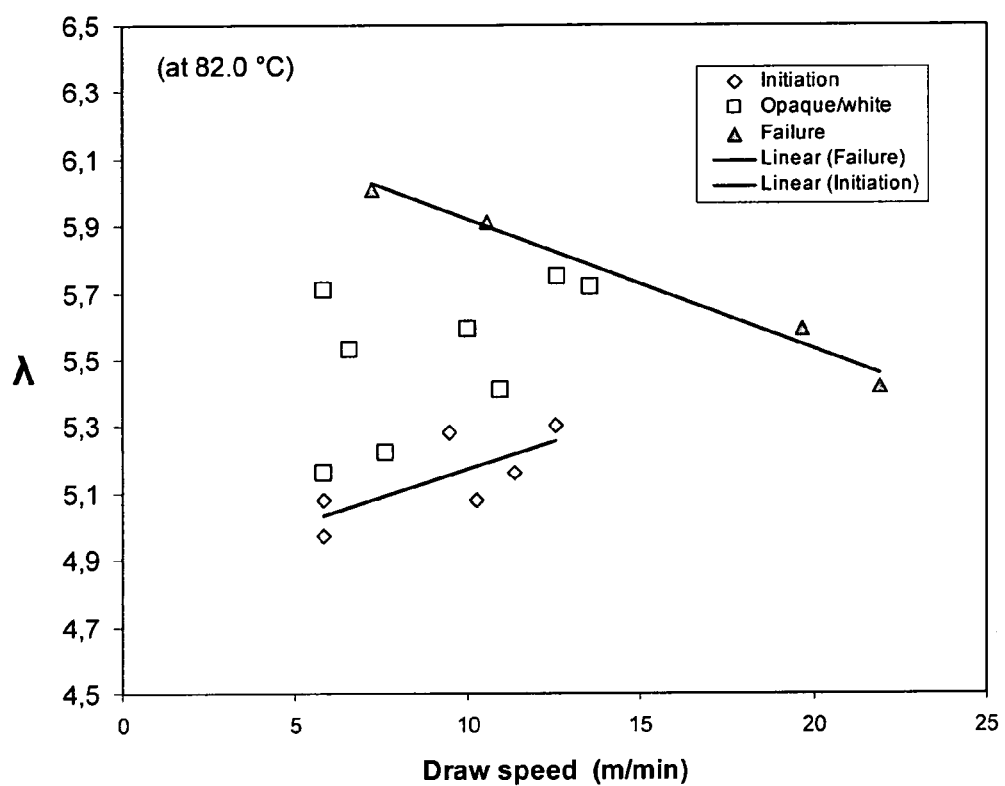
FIG. 1 shows the draw ratios at which (first) stress-whitening and film failure are observed for different combinations of roller speeds at 82° C.

Within the context of the present application a film is understood to mean an unsupported section of plastic material, like a sheet, strip or tape, whose thickness is very thin in relation to its length and width, and whose cross section is preferred to be rectangular. The thickness of a film may be in the range from 5 to 2000 µm, and width may vary from 0.5 mm to 2 m or more. Typically, the length can be from indefinite, if the film is made with a continuous process, to any desired length, e.g. by cutting. A tape or strip generally is of relatively small width, typically in the range 0.5-50 mm, and may be made by splitting a sheet or film.

An opaque film is understood to mean a film that is not transparent or impenetrable to human sight, and which has a white or whitish colour if made from a thermoplastic polyester composition of natural colour; but optionally of different colour if the polyester composition contains one or more colorants.

Oriented opaque polyester films can be made in different ways, generally by making a polyester composition containing some opacifying additives or other components. For example, white pigments like titanium dioxide particles may be used to give a whitening and opacifying effect, dependent on their concentration. Adding particulate pigments usually results in a roughening of the polyester film surface, giving it a dull, non-glossy appearance.

In U.S. Pat. No. 4,780,402 it is indicated that if the specified amount of barium sulphate having specified particle size is used in a polyester composition, a film can be obtained that shows improved opacity and a glossy surface. This is explained not only by the relatively high amount of small particles that is used, but also by voiding that occurs around the additive particles in the film upon drawing (also referred to as stretching), which enhances opacity.

Making an oriented opaque polyester film by formation of fine voids in the interior of the film during stretching, which voids induce diffusion of light, is also known from other documents like EP0496323A2, U.S. Pat. No. 6,641,924B1, and publications cited therein. In these documents first a polyester composition is made, which contains a relatively high amount of finely dispersed particles of a polymer that is incompatible with the polyester. When an amorphous film made from such composition is subsequently stretched, a void is formed around each particle. Typical examples of polymers that are incompatible with polyesters include non-polar materials like polyolefins and polystyrenes. For example, in EP0300060A 3-40 mass % of polypropylene is added to PET; in EPO496323A2 a polyester composition containing typically 2-25 mass % of polymethyl pentene is used; and in U.S. Pat. No. 6,641,924B1 5-60 mass % of a specific cycloolefin copolymer is applied to initiate void formation upon drawing a polyester film. An additional advantageous effect of void formation is the resulting lower density of the film; a decrease from about 1400 kg/m$^3$ for conventional transparent oriented PET film to values in the range 400-1300 kg/m$^3$ has been reported in above documents for such micro-porous films.

Oriented opaque polyester firms can be used for various applications; like for packaging of light-sensitive food or other items, for making thermo-formable sheets, for use as label film, as image-recording film, or, after splitting into strips, for making woven fabrics that can be used as geo-textile, tarpaulin, or for packaging and transporting purposes.

A drawback of the process as known from U.S. Pat. No. 4,780,402 is that first a polyester composition comprising well-dispersed fine pigment particles should be made. In addition, the inorganic particles increase the density of the composition and the film; which partly annuls the lowering of density resulting from void formation in the film. A further disadvantage of the presence of inorganic particles is that mechanical properties of the film tend to be negatively affected.

The object of the present invention is therefore to provide a process for making an opaque polyester film that does not show said drawbacks.

This object is achieved according to the invention with a process for making an opaque film from a thermoplastic polyester composition, comprising the steps of
- a) extruding the polyester composition through a slot die, and quenching to form a substantially amorphous film having a crystallinity of at most 5%;
- b) rapidly heating the amorphous film to a drawing temperature in the range from $T_g$ to $(T_g+50)°$ C. while applying a draw ratio in the range of from $\lambda_{initiation}$ to $\lambda_{max.}$ in longitudinal direction, and a drawing rate of at least 1 m/min to form an oriented film showing stress-whitening, wherein $\lambda_{initiation}$ is the draw ratio at which a transfer from a transparent product to a stress-whitened product occurs and $\lambda_{max.}$ is the draw ratio at which failure of the stress whitened film occurs;

c) heat-setting the oriented stress-whitened film;
and wherein the thermoplastic polyester composition substantially consists of at least one crystallisable polyester derived from at least one aliphatic diol and at least one aromatic dicarboxylic acid.

With the process according to the invention, it is possible to make a unitary, glossy, opaque film from a polyester composition that does not contain void-forming additives like high amounts of fine pigment particles or dispersed non-miscible polymer particles. The film obtained not only shows good opacity and high gloss, but also has reduced density and very good mechanical properties. It is a further advantage that the process can be performed continuously on conventional extrusion and stretching equipment used for making transparent film from polyesters; be it in a narrow processing window with proper control of processing conditions, like temperatures, draw rate and draw ratio.

It is surprising that the process according to the invention results in a glossy opaque film without the use of opacifying agents or void-inducing additives, because such polyester compositions are conventionally processed into transparent films on the same equipment but applying different processing conditions.

In the process according to the invention, an opaque film is made from a thermoplastic polyester composition that substantially consists of at least one crystallisable polyester derived from at least one aliphatic diol and at least one aromatic dicarboxylic acid. The composition substantially consisting of a polyester means that it further contains only conventional additives in customary amounts; and that the composition is substantially free of void-inducing additives, i.e. it contains no significant amounts of e.g. pigment or other mineral particles or dispersed incompatible polymers acting as initiators for voiding.

The polyester composition may contain one or more conventional additives as known to a skilled person, like stabilisers, such as heat-stabilisers, anti-oxidants, and light stabilisers; processing aids such as lubricants and antiblocking agents; and colorants, both pigments and dyes; and catalyst residues. Generally, each of such additives is used in an amount of some tenths of a percent up to some mass %; the composition typically contains at most 5 mass % of customary additives, preferably at most about 4, 3, 2 or even 1 mass %.

The thermoplastic polyester composition that is used in the process according to the invention for making an opaque film substantially consists of at least one crystallisable polyester. Suitable polyesters show such crystallisation behaviour, that by rapidly cooling molten polymer from the melt to below the glass transition temperature ($T_g$), called quenching, hardly any crystallisation occurs; that is a substantially amorphous product is obtained. Such slowly crystallising polyester should, on the other hand, be able to form crystallites upon orienting the polymer chains during drawing or stretching the amorphous product, for example above $T_g$, to result in a semi-crystalline oriented product. Such suitable crystallisable polyester is derived via polycondensation reactions from at least one aliphatic diol and at least one aromatic dicarboxylic acid. Suitable aliphatic diols include alkylene diols, like ethylene glycol, 1,3-propane diol (or trimethylene glycol), 1,4-butane diol (or tetramethylene glycol); cycloaliphatic diols like 1,4-cyclohexanedimethanol; and diols that may also be formed during the polycondensation reaction like diethylene glycol. Suitable aromatic dicarboxylic acids include terephthalic acid, isophthalic acid, phthalic acid, naphthalene 2,6-dicarboxylic acid, and biphenyl 4,4'-dicarboxylic acid. The skilled man is able to select a polyester, copolyester, or combinations thereof, which show the desired crystallisation behaviour. Preferred examples of suitable polyesters include members of the group consisting of polyethylene terephthalate (PET), polyethylene naphthalate (PEN) and their copolymers. Preferably, such copolymers of PET and PEN contain at most about 15 mol % of one or more other diol and/or dicarboxylic acid, more preferably at most 10, or 5 mol % of comonomer.

Suitable polyesters that can be used in the thermoplastic polyester composition in the process according to the invention have a molar mass that results in a melt viscosity that allows easy and stable extrusion, and which results in a desired level of mechanical properties of extruded products; as is known to a skilled person. Typically, an indication for the molar mass of thermoplastic polyesters is derived from measuring the viscosity of diluted solutions; for example expressed as Intrinsic Viscosity (IV). Suitable polyesters have an IV in the range 0.5-2.5 dL/g. A certain minimum IV is needed for extrudability and higher IV generally results in better mechanical properties, but too high a viscosity may hamper processing behaviour. Thus, IV is preferably at least 0.55, 0.6 or even 0.65 dL/g, and at most 2.0, 1.8 or 1.6 dL/g.

The process for making an opaque film from a thermoplastic polyester composition according to the invention comprises a step of extruding the polyester composition through a slot die, and quenching to form a substantially amorphous film. Typically, a flat film die is used to extrude the polymer melt into a melt film that is then quenched into a solid film. The dimensions of the die are chosen such to give a desired thickness and width for the film after drawing. A certain minimum thickness is needed to give a stable and uniform film extrusion; preferably the thickness is at least about 10 μm, more preferably at least 20, 50 or 100 μm. The thickness of the molten film after leaving the die is such that quick and homogeneous cooling in the quenching step is possible, to give a homogeneous amorphous product, and may be as high as 10 mm. Quenching can be done using known methods; preferably the film is casted onto one or more cooled drum(s) or roller(s), which are preferably polished, to better control surface smoothness of the film. To enable quick and homogeneous cooling, the molten film has preferably a thickness of at most about 3 mm, more preferably at most 1000, 500, 250, or 150 μm.

The width of the die and molten film may vary widely, for example from 0.1 to 3000 mm. As the drawing process of the invention has a narrow processing window for stable operation, good dimensional control of the extruded film is also important. Considering that some thickness and width variations are frequently observed on the edges of an extruded film, it is preferred to trim off the edges of the film before drawing. Therefore, a width of at least about 1 mm is preferred; more preferably the width is at least 5, 10, 50 or 100 mm. For making strips, for example, that have a width of on the order of 0.5-50 mm, it is in this respect preferred to extrude a wider film, for example from 1 to 3 m wide, to trim the edges and then to slit the film into strips of desired width before or after drawing, or even after heat-setting.

In the process of the invention a thermoplastic polyester composition is extruded through a slot die, and quenched to form a substantially amorphous film. It is found that to secure a stable drawing process the substantially amorphous film should have a crystallinity of at most 5%, as for example measured by the density method. Preferably the amorphous film has less than 3% crystallinity, more preferably less than 2 or 1%, and most preferably has no measurable crystallinity. An amorphous PET homopolyester film that has no measurable crystallinity will be highly transparent and typically a density of about 1335 kg/m$^3$ and a haze of less than 2%.

In general, crystallinity of polyester films can be measured with different methods, including X-ray diffraction; haze and transparency measurement; Differential Scanning Calorimetry (DSC); and density determination.

An X-ray photo of an amorphous polyester film will show a halo with no distinct Bragg diffraction peaks, and is well known to those skilled in the art. If a one dimensional pattern (X-ray diffractogam) is recorded of the film, a very broad scattering between 2θ=10° to 35°, centred about 20° is found. Even if only 3% crystallisation has taken place, such a diffractogram will start to show sharper peaks superimposed on the amorphous scattering.

An amorphous polyester sample when heated in a DSC apparatus at 10° C./min shows a step-like change in the heat capacity around 75° C. indicating the glass transition; an exothermic cold crystallisation peak at about 120-135° C., with an enthalpy of about 28-47 J/g; and an endothermic melting peak at about 255-260° C. with enthalpy of about 65 J/g (see Bashir et al., Polymer Engineering and Science, 40, 2442 (2000) for typical DSC curves of amorphous and semi-crystalline PET). If there is any crystallinity present in the film at the start, the $T_g$ becomes weaker, the cold crystallisation exotherm shifts to lower temperatures (that is moves closer to the Tg) and become less intense and the melting endotherm becomes sharper. The more amorphous the film, the stronger the $T_g$ and the higher the values of cold crystallisation enthalpy (more close to 47 J/g than 28 J/g).

While a semi-crystalline PET product may be transparent or opaque, an amorphous PET film will be transparent (unless containing opacifiying additives). A further quantitative test to measure degree of crystallinity is measuring the haze of the amorphous film. Haze can originate from surface irregularities and from variations in refractive index in the bulk. Ignoring surface irregularities, the main cause for haze is spherulitic crystallisation of the polyester film, because amorphous and crystalline regions have different refractive indices. Generally, haze in PET increases rapidly with increasing levels of spherulitic crystallinity (see S. A. Jabarin, Polymer Engineering & Science, vol. 22, 815 (1982)), so that even with 3% crystallinity the haze is visible to the human eye. Qualitatively, the amorphous films suitable for the process of the invention are clear to the eye. Haze is expressed as the percentage of the total transmitted light that after passing a film sample is scattered by more than 2.5° (see ASTM D-1003-97). Suitable amorphous films for making the stress-whitened films preferably have haze levels less than about 2%.

The density of a polyester article is very sensitive to presence of crystalline material and thus a good measure of degree of crystallinity. The literature value for the density of amorphous PET is $\rho_a$=1333 kg/m$^3$ (see J. Brandrup & E. H. Immergut, Polymer Handbook, 2$^{nd}$ Edition, Wiley-Interscience, 1975). For 100% crystalline PET, the most commonly used reference density is $\rho_a$=1455 kg/m$^3$ (see P. Daubeny, C. W. Bunn and C. J. Brown, Proceedings of the Royal Society, A226, 531 (1954)). However, several authors have reported on experimental samples with densities higher than this reference value. Thus, another reference value for 100% crystalline PET is $\rho_c$=1515 kg/m$^3$ (see S. Fakirov, E. W. Fischer and G. F. Scmidt, Die Makromolekulaire Chemie, 176, 2459 (1975). Bashir et al. have discussed the reference values for 100% crystalline PET and the effect it has on the calculated crystallinity, see Polymer Engineering and Science, 40, 2442 (2000). Densities are generally measured using calibrated density gradient columns.

The process according to the invention comprises a step of rapidly heating the amorphous film to the drawing temperature. The inventors have found that it is essential the amorphous film be rapidly heated to the desired drawing temperature to result in a stable process, wherein drawing typically takes place with necking. Rapid heating can be induced with various technologies known to a skilled person, for example with infrared heaters, or by immersing the amorphous film in a liquid heating bath heated to the desired drawing temperature, and also performing the drawing in the machine direction in this bath. The temperature of a liquid bath can be very accurately controlled (to about 0.5° C.), and ensures good heat transfer to the film. Suitable liquids for use in the heating bath (inert to the polyester) are known to a skilled person liquid. Examples of a suitable liquid include water, or water/glycerol mixtures.

The drawing temperature in the process according to the invention is in the range from $T_g$ to $(T_g+50)°$ C. In principle, drawing could also be performed at lower temperature, but then the drawing rate will be too low for practical and economic application. At a temperature of more than 50° C. above $T_g$ thermal (also called cold) crystallisation may start to interfere with the desired orientation-induced crystallisation, reducing drawability. Therefore, the drawing temperature is preferably below $(T_g+40)°$ C.; more preferably below $(T_g+30)$, $(T_g+25)$ or even below $(T_g+20)°$ C. Preferably, the drawing temperature is above about $(T_g+5)°$ C. to allow faster drawing than can be achieved at temperatures below Tg; more preferably the drawing temperature is above $(T_g+10)°$ C. For PET for example, the preferred temperature range is from about 75 to about 105° C., more preferably 80-100, or 85-95° C.

Preferably, the drawing temperature is controlled to a constant value to ensure stable operation; the bath temperature is for example controlled within a range of ±1.0 or ±0.5° C.

In the process according to the invention the amorphous film made from the thermoplastic polyester composition is rapidly heated to the desired drawing temperature while applying a draw ratio (λ) close to the maximum draw ratio in longitudinal direction to form an oriented film showing stress-whitening. The onset of stress whitening can be easily recognised by eye as the film starts to show silvery streaks and patches. As the draw ratio is carefully further increased the stress whitening becomes uniform across the width of the film. The maximum draw ratio ($\lambda_{max}$) is defined herein as the draw ratio at which failure (breakage) of the stress whitened film occurs on a regular basis. The inventors surprisingly found that, depending on for example the type of polyester, drawing temperature and draw rate (or production speed, that is the speed of the take-up rolls), stress-whitening occurs upon drawing within a narrow range of draw ratios just below $\lambda_{max}$, for example at from $(\lambda_{max}-a)$ to $(\lambda_{max}-b)$, wherein a is at least about 0.05; 0.1; 0.15; 0.20; 0.25; 0.30; 0.35; 0.40; 0.45; or 0.50 and b is at most about 1; 0.95; 0.90; 0.85; 0.80; 0.75; 0.70; 0.65; 0.60; or 0.55. At a certain set of conditions and by steadily increasing draw ratio, there is found to be a certain draw ratio at which a transfer from a transparent product to a stress-whitened product reproducibly and uniformly occurs, referred to as $\lambda_{initiation}$. The draw ratio to be applied should thus be in the range from $\lambda_{initiation}$ to $\lambda_{max}$. Upon applying such draw ratio, a whitening of the film occurs, referred to as stress-whitening. There are at least three interacting variables that control stress-whitening: draw ratio, temperature and drawing speed. The inventors found that conditions that lead to high stress in the film result in stress-whitening; meaning that typically conditions of relatively high draw ratio, low temperature, and high deformation rate are preferred.

As indicated above, the processing window wherein the stress-whitening effect occurs in a controlled and stable process is rather narrow. Preferably, also the applied draw ratio is therefore kept constant. Drawing is generally effected by guiding the amorphous film first over a set of feed rollers and then over a set of draw rollers that are operated at higher speed, with heating of the film. In order to control variations in draw ratio, preferably drawing is effected with feed and draw rollers the speed of which can be controlled in such way that speed fluctuations of at most about 1% occur, more preferably speed fluctuations are at most about 0.7, 0.5, or 0.3%. Further, the film thickness should be as uniform as possible; in this regard, it is preferred to draw a film after trimming the edges.

Drawing rate (speed) should be sufficient to create stress in the film to initiate stress-whitening. Because drawing resulting in stress-whitening typically occurs with necking, local strain rates may thus be considerably higher than applied drawing speed. Drawing rate (take-up speed of the drawing rollers) is generally at least about 1 m/min, preferably at least about 2, 3, 4, 5, 10, 15, 20, 50, 100 m/min. Too high a drawing rate may induce breakage, but actual values are dependent on actual film dimension and processing conditions, control of thereof, and on polyester composition. Good results have been obtained with drawing speed in the range of from about 5 to 20 m/min, but higher rates of up to about 600, 550, 500, 350, 250 or 200 m/min are considered to be feasible in practice.

The process according to the invention may further comprise subsequent to longitudinal drawing, a step of applying a draw ratio in the transverse direction at elevated temperature to form a bi-axially oriented, opaque film. The draw ratio to be applied is not particularly critical, and may vary from about 2 to about 5, depending on the polyester composition and desired film. This second transverse drawing step, perpendicular to the machine direction, is typically performed using a so-called tenter frame and an oven; drawing temperature is in the same range as the first drawing step, this is in the range of from $T_g$ to $(T_g+50)°$ C.

Conventional, transparent polyester bi-axially oriented film can also be made with simultaneous drawing in two perpendicular directions; but such simultaneous bi-axial drawing is found to be less suited than the above described sequential process for making opaque oriented polyester film.

The process for making an opaque film from a thermoplastic polyester composition also comprises a step of heat-setting the oriented film. If the opaque film is not heat set, it may form ripples (or a wavy structure) with time. The step of heat-setting can be performed off-line but is preferably done in-line, using equipment and applying conditions as known to a skilled person. Typically, the temperature for heat-setting is in the range of about 150-250° C., a small draw ratio is generally applied to prevent relaxation effects. Once heat-set, the opaque polyester film is stable and does not form ripples.

After heat-setting, the opaque film obtained can be wound up into rolls in a usual manner. The film may further be subjected to one or more additional steps to establish other desired properties; like a chemical treatment step, a corona-treatment, or a coating step.

In a preferred embodiment, the process according to the invention comprises the steps of
 a) extruding a thermoplastic polyester composition substantially consisting of a polyethylene terephthalate through a slot die, and quenching to form an amorphous film having a crystallinity of less than 3%;
 b) rapidly heating the amorphous film to a constant drawing temperature in the range 80-95° C. by immersing the film in a liquid heating bath, while applying a draw ratio in the range of from $\lambda_{initiation}$ to $\lambda_{max.}$ in longitudinal direction using sets of feed and draw rollers the speed of which can be controlled in such way that speed fluctuations of at most about 1% occur, and a drawing rate of at least 1 m/min, to form an oriented film showing stress-whitening, wherein $\lambda_{initiation}$ is the draw ratio at which a transfer from a transparent product to a stress-whitened product occurs and $\lambda_{max.}$ is the draw ratio at which failure of the stress whitened film occurs;
 c) heat-setting the oriented film in the range of about 150-250° C.

The film obtained with the process according to the invention is glossy, opaque, and typically has a density in the range 500-1300 kg/m³. The reduced density and opaque appearance appear to have resulted from small voids that are formed during the drawing process in the film. The surface of the film, however, remains essentially non-porous, which likely explains its glossy lustrous appearance. The opaque film has very good mechanical properties; typically its tensile properties, like tensile strength and modulus, are similar to those of a corresponding transparent film made from the same polyester composition with a conventional drawing process (that is with a draw ratio below $\lambda_{initiation}$). If the tensile properties of a film obtained with the process according to the invention are expressed on a mass basis, its properties (referred to as specific strength and specific modulus) may exceed those of corresponding transparent films, and provide a unique combinations of properties.

The invention therefore also relates to an opaque polyester film obtainable by the process according to the invention. Such film can be advantageously used in many different applications, like packaging or lamination applications. The opaque (white) background coupled with high gloss provides an attractive surface for printing.

Surfaces may have shiny or lustrous, metallic or matt appearances. The more is direct light is reflected from a surface, the glossier the impression to an observer. A polyester like PET generally gives more glossy surfaces than a polyethylene or polypropylene film. For smooth or highly polished surfaces, the incident light is directly reflected at the surface, i.e. only in the main direction of reflection, and the angle of incidence is equal to the angle of reflection. On rough surfaces, the light is in addition diffusely scattered in all directions; a reflected object does not appear brilliant, but dull and blurred to an observer. The more reflected light is scattered, the less intense is the reflection in the main direction and the duller the surface will appear.

Gloss measuring instruments measure gloss in gloss units (GU) at 60°, 45° and/or 20° reflecting angle. When measuring at 60° the difference that is typically visually noticed depends on the relative gloss levels of two samples being compared. For instance 3 GU difference measured on a very matt surface (e.g. 5 GU), would be seen by the human eye, but on a higher gloss surface (say 60 GU), a difference of 3 GU would be very difficult to notice. Comparing polypropylene and PET tape, the difference is clear both to the eye and to a measuring instrument.

More specifically, the invention relates to an opaque polyester film obtainable by the process according to the invention having a density of 500-1300 kg/m³, preferably of 800-1200 kg/m³. The opaque polyester film typically has a tensile strength of at least 250 MPa, preferably at least 300 or even 350 MPa. The film further combines opacity with a glossy surface, preferably gloss at 60° is at least 50 or 60 GU and haze is at least 80 or 90%

In a special embodiment of the invention, opaque film, or rather strip or tape is used to make finished and semi-finished articles, such as a woven fabric, suited for many—mainly industrial—end uses like geo-textiles and the like. Compared with woven fabrics made from transparent polyester films, the present woven tape fabric shows a lower density, and better contrast of printed matter on its white/opaque background. Compared with woven fabrics made from polypropylene films or tapes, which are used on a large scale for various applications like big bags, the present woven shows significantly better mechanical properties, while also offering a.o. higher gloss, better UV resistance, higher temperature stability, low creep, and direct printability. A further example of application is a bag or sack smaller than a flexible intermediate bulk is container, e.g. capable of holding about 5 to 100 kg of material. Such bag may be used for packaging of supermarket items such as rice and sugar, and also of industrial materials such as cement. For the food packaging application, opacity combined with gloss, and good printability and excellent contrast add attractiveness and eye appeal.

Other applications of the opaque polyester tapes of this invention may include ropes, especially for marine applications; the advantage being a density lower than 1000 kg/m³, making the rope floatable on water.

The invention will be further elucidated with reference to the following experiments.

Methods

Density

Density of a film sample was measured in a density gradient column. Because of the wide range two columns were used: one column set up for the density range of conventional PET (1330 kg/m³ to 1445 kg/m³), and a second column set up for polypropylene (880-970 kg/m³).

The percentage crystallinity $X_c$ was computed from density measurement with the equation:

$$x_{c_\square} = \left(\frac{\rho_c}{\rho_{sample}}\right) \cdot \frac{(\rho_{sample} - \rho_a)}{(\rho_c - \rho_a)} \times 100$$

wherein $\rho_c$=1455 kg/m³ for 100% crystalline PET, and $\rho_a$=1333 kg/m³ is the density of amorphous PET.

Typically, for a cast amorphous film $\rho_{sample}$ was between 1333 to 1335 kg/m³; which translates to 0-1.8% crystallinity.

Glass Transition Temperature

The glass transition temperature $T_g$ was measured on amorphous film, using a Differential Scanning calorimeter with heating rate 10° C./min. The midpoint of the step-like change in heat capacity was taken as the $T_g$. For PET homopolymer and copolymers with low levels of comonomer (<2 mol %), the $T_g$ was found to be about 75° C.

Intrinsic Viscosity

I.V. was measured on a dilute solution of a polyester sample in a 3:2 mixture of phenol-1,2 dichlorobenzene solution, at 25° C. (single measurement). The I.V. was calculated from the measurement of relative viscosity $\eta_r$ for a single polymer concentration (c=0.5%) by using the Billmeyer equation $$I.V.=[\eta]=0.25(\eta_r-1+3\ln\eta_r)/c$$

Tensile Properties

Tensile stress-strain curves were obtained by drawing a film or tape sample at room temperature in a tensile testing machine at a draw speed corresponding to an initial strain rate of approximately $10^{-3}$ s$^{-1}$. The modulus was recorded as the initial slope of the stress strain curve up to a strain of 0.2%.

Gloss

Gloss of films was measured at 45° and 60° using a gloss meter for bi-axially drawn samples. For uniaxial tapes made by extruding from a slot die of 4 mm width, the individual tapes were not wide enough to measure gloss. Hence, a parallel array was made by sticking tapes on a cardboard. This may lower the quality of the measurement for some reasons: the sample may not be completely flat; some curvature at the two edges can occur; and slight gaps between adjacent tapes may be present. Nevertheless, the measurement was able to show gloss difference between opaque PET tape of the invention and other tape samples.

Opacity or Haze

Haze is the percentage of the total transmitted light that after passing through a film sample is scattered by more than 2.5° (see ASTM D-1003-97). The haze was measured with a Haze Gard Plus from BYK Gardner on bi-axially stretched films. No effort was made to separate surface and bulk contributions.

Uniaxial films were generally not wide enough for haze measurement, hence the opacity was tested qualitatively by placing the tape over a typed manuscript, and inspecting the hiding power. The conventionally drawn transparent tape and the opaque tapes of the invention were compared in this way; both having a similar thickness.

Uniaxial Drawing Experiments

Comparative Experiments A

A PET homopolymer, i.e. based on ethylene glycol and purified terephthalic acid as monomers was first dried at 175° C. during about 5 hours in a vacuum oven. The polymer was extruded with a single screw extruder using standard temperature settings through a slot die onto a chilled roll of temperature of about 25° C. A film of 4 mm width and 200 μm thickness was generally made, which film was quenched on a chill roller. The transparent amorphous film, which had an I.V. of 0.70 dL/g and a crystallinity of <1%, had slightly curved edges when viewed in a microscope. This film/tape was too narrow for slitting and trimming thickened edges. The tape was subsequently heated by passing over the curved surface of a hot shoe heated to about 90° C., by using a set of 5 feed and a set of 7 draw rollers. Initially the speed of the draw rollers was set to result in a draw ratio of 3.0; resulting in a transparent stretched film, which was subsequently heat-set under tension by passing through an air oven heated to 170° C. with take-up rollers running 3% faster than feed speed of the oriented film.

The draw ratio was defined as the ratio of the two roller speeds i.e.

$$\text{Draw ratio} = \frac{\text{Draw roller speed}}{\text{feed roller speed}}.$$

The diameters of the feed and draw rollers being the same, this corresponds to the draw ratio imposed in the machine direction i.e. the nominal draw ratio. This may include some elastic strain that is recovered when the fibre/tape is removed from the rollers, consequently the actual draw ratio may be slightly less than the values recorded.

After the process had run stably during at least about 5 minutes, the draw ratio was increased step-wise to 5.0. Further increasing the draw ratio resulted in breakage of the film. It was observed, however, that during a very short time a milky white film was made. Additional tests led to the conclusion that no stable production of such white film was possible with this experimental set up; although variables like temperature of the hot shoe and drawing speed appeared to have some influence.

Comparative Experiments B and Example 1

Tests as described for Comparative experiments A were repeated, but now the amorphous film was passed through a water bath between the feed and draw rollers. In this series of experiments the temperature of the water bath was controlled at 82.0° C. Starting with a feed roller speed of 1.19 m/min, the speed of the draw rollers was gradually increased. The speed of the rollers showed a standard deviation of about 2%.

The amorphous film had an I.V. of 0.71 dL/g and a crystallinity of <1%. Stable production of transparent film was possible up to a draw ratio of about 4.9. In Table 1 some properties are presented for a film made at λ=4.0 (CE B).

Upon further increasing the speed of the draw rollers at said constant feed roller speed, a transition was observed from a transparent into a glossy white film at around λ=5.1 (initiation). At draw ratios of about 5.2-5.7 opaque film could be made during prolonged times and full bobbins could be wound up, but at λ=6.0 film breakage occurred within 5 minutes, and no stable production appeared possible anymore.

In FIG. 1 the results of several series of experiments are summarized, by showing the draw ratios at which (first) stress-whitening and film failure is observed for different combinations of roller speeds (at 82° C.). There thus appears to be a narrow, defined processing window in which a glossy opaque PET film can be produced in stable and reproducible manner.

Opacity or haze was assessed qualitatively: if transparent PET tape was placed on a manuscript the typed letters could be seen and read easily, but for the opaque film/tape samples the writing could hardly be seen/read.

In Table 1 some properties of an opaque film made with λ=5.2 are presented (after heat-setting). The opaque film of Example 1 floated in water, but when placed in a density gradient column spanning the range to 970 kg/m³, it sank to the bottom. Thus, the actual density must lie above 970 but below 1000 kg/m³.

In Table 1 also some data for a commercial uniaxially drawn polypropylene (PP) film is presented for comparison. It is clear that the opaque polyester film shows much better mechanical properties than PP, and even somewhat higher strength than conventional transparent PET film.

TABLE 1

| | | | tensile properties | | |
|---|---|---|---|---|---|
| experiment | tape description | density (kg/m³) | modulus (MPa) | strength (MPa) | elongation at break (%) |
| CE B | transparent PET | 1400 | 9.9 | 356 | 24 |
| Example 1 | white, opaque PET | 970-999 | 10.0 | 398 | 12 |
| | uniaxial PP | 912 | 2.83 | 219 | 9 |

Comparative Experiments C and Example 2

Figure 2:
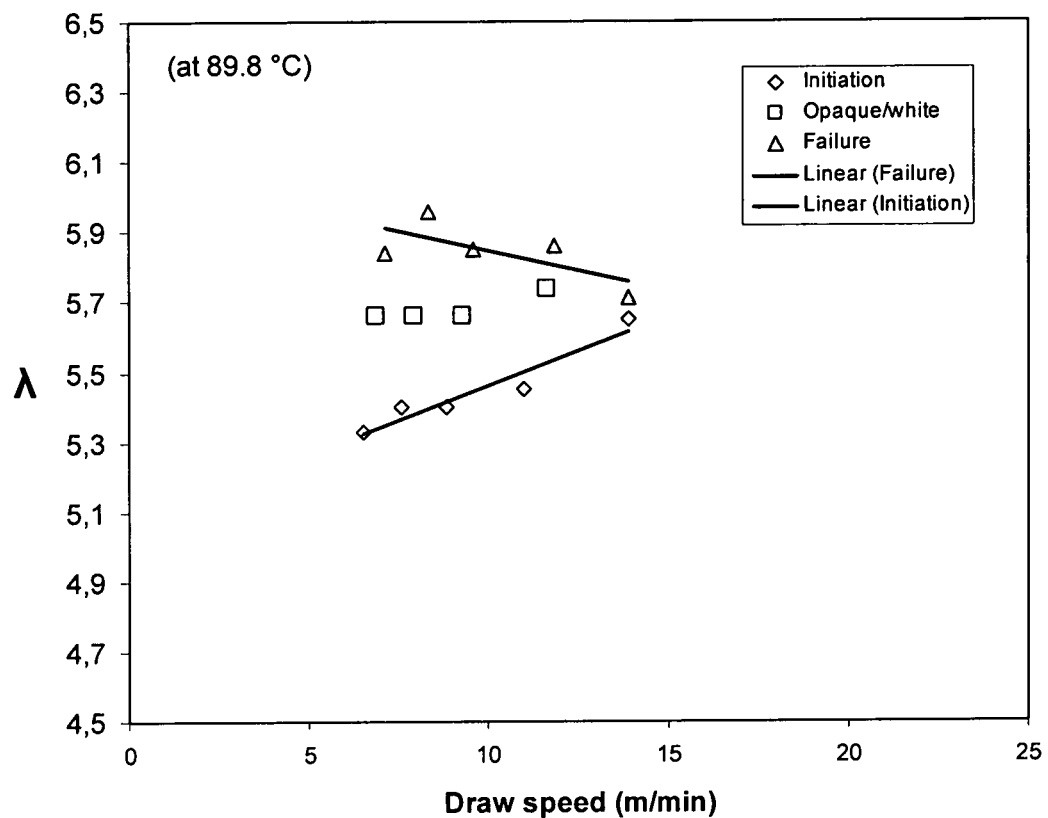
FIG. 2 shows the draw ratios at which (first) stress-whitening and film failure are observed for different combinations of roller speeds at 89.8° C.

The experiments as described for Comparative experiments B and Example 1 were repeated, but now the water bath was controlled at 89.8° C. Again, clear regimes were identified wherein either transparent films (CE C) can be made, or wherein stable production of opaque is possible, be it that the window for making opaque films of Example 2 appears somewhat narrower than at 82° C. drawing temperature. This is further illustrated by the data compiled in FIG. 2. Table 2 gives gloss and haze data for tapes of the invention, as well as those of comparative specimens.

These data show that uniaxial opaque tape made according to the invention has lower gloss than that of transparent PET tape, but significantly higher gloss than PP film; which was also unambiguously noted visually. When the tape of Ex. 2 was placed over a typewritten line, the printing could not be read through it.

TABLE 2

| experiment | film description | Gloss at 60° (gloss units) | Gloss at 45° (gloss units) |
|---|---|---|---|
| Example 2 | Uniaxial opaque PET | 52 | 32 |
| CE C | Uniaxial transparent PET | 94 | 66 |
| | Uniaxial translucent PP | 45 | 21 |

Bi-Axial Drawing Experiments

Comparative Experiments D-H, Example 3

For performing bi-axial drawing of amorphous films, a batch process was used, which is more convenient on a laboratory scale. A skilled person will readily understand that the observations will be fully transferable to a continuous extrusion process.

Comparative Experiments D

A dried polyester composition comprising a PET polymer comprising 1.55% isophthalic acid (IPA) as comonomer and without further additives was first compression moulding between brass moulds, using a hot press at 260° C. After a dwell time of at most 2 minutes the sample was removed from the press and quenched in water, to obtain a transparent, amorphous film. The sample had an I.V. of 0.73 dL/g and a crystallinity of <1%. Typical sheet thickness was between 0.25 and 0.5 mm (CE D-a).

Samples of 60 by 60 mm were then cut from these amorphous sheets and bi-axially drawn at a typical temperature of 100-110° C. on a T.M. Long bi-axial stretching machine. Draw ratios of 3× in the MD and 4× in the TD were used. The speed of each arm during drawing was about 100 mm·s$^{-1}$. A grid with squares was printed on the amorphous film, to follow the extent of drawing.

For conventional drawing, the deformation was simultaneous in the two directions to an imposed draw ratio of 3 by 4 (CE D-b).

The gloss and haze of the amorphous film before drawing were measured (see Table 3). Due to some scratches on the mould plates, the transparency and gloss are somewhat reduced. After drawing and heat setting, gloss and haze improve as surface scratches are ironed out, although values as high as the commercial film (see bottom of Table 3) were not reached.

Example 3

Opaque bi-axially stretched PET containing no void inducing additives was made according to the invention. An amorphous PET film was made by compression moulding as in Comparative Example D. The sample had an I.V. of 0.72 dL/g and a crystallinity of <1%. This film was first stretched 3× at 99° C. at a very high rate (1 m/s) in the machine direction to induce stress whitening, followed by 4× stretching in the transverse direction. Stress-whitening could not be reproducible obtained with simultaneous drawing in two directions. The stress-whitening effect is apparently only obtained under conditions of high stress, viz. at low temperature, at high stretching rate, or at high draw ratio. In this experiment, a high uniaxial stretching rate was used to drive the material into the opaque condition.

Qualitatively, the film had a silvery white, attractive appearance, confirming that a unique combination of opacity and gloss can be attained by the process of this invention.

Results of gloss measurements are given in Table 3. It can be seen that the opaque bi-axial film made according to the invention does have relatively high gloss; higher than the results found for uniaxial opaque film, which was not measured under ideal conditions.

Microscopic investigations learned that the film thus obtained contains small voids that are mainly in its interior, whereas the outer surface layers appear to be essentially non-porous. Without wishing to be bound to any theory, the inventors suppose this non-porous surface is the reason that the oriented film has a glossy lustrous surface appearance; much like transparent oriented polyester films.

Comparative Experiments E

Experiment CE D was repeated, but now a polyester composition comprising the same PET copolymer and 546 ppm by weight of ZnO, a void-inducing additive, was made, by added the additive in situ during polymerisation. An amorphous film was made by compression moulding the pellets, and was sequentially stretched into bi-axially oriented films. After 3×4 drawing at 110° C., the film became 70 microns thick. The haze and gloss at 45° and 60° were measured before and after drawing; see Table 3.

Drawing resulted in gloss reduction, and haze increase. It was observed that indeed ZnO induced voiding and surface roughness. The film appearance was not attractive.

Comparative Experiments F

Experiment CE D was repeated, but now a polyester composition comprising 0.1% nano $TiO_2$ was made. The particulate additive was added in situ during polymerisation. The bi-axially oriented film obtained was about 70 microns thick, showed good gloss, but was only somewhat hazy caused by scattering from the $TiO_2$, and no voids were observed.

Comparative Experiments G

Experiment CE D was repeated, but now a polyester composition comprising 1% pearlescent pigment (Eckart PX 2151 mica platelets coated with a nano $TiO_2$ layer) was made. The amorphous film had a pink colour, when viewed at low angles and was cream-brown when viewed at a normal angle. This was used to make sequentially stretched (3×4), bi-axially oriented films of about 70 microns thick. The haze was 99.8%, meaning the film was opaque, which decreased after stretching.

The observed increase in gloss upon stretching is likely caused by selective reflexion of light (pinkish) at low angles. The pearlescent mica induces voiding. The film was not very attractive, despite the selective, angle dependent colour effect: its surface was rough, even to the touch.

Comparative Experiments H

Now a polyester composition comprising the same PET polymer with 1.06 wt % nano silica (Nyacol DP 5820) was made by in situ during polymerisation. An amorphous film showed good gloss before drawing and some haze due to the nano silica.

After 3×4 drawing gloss improved slightly, but haze decreased to 2.0% because the film had thinned down. The nano silica behaves like the nano $TiO_2$—it does not induce voiding, hence the film is glossy and transparent, with a slight haze.

For further comparison Table 3 also shows some gloss and haze values for a transparent commercial bi-axially oriented PET film of 800 microns thickness (Du Pont Mylar); for a high density polyethylene film (HDPE); and for a linear low density polyethylene film (LDPE). These data indicate that polyethylene films have relatively low gloss and high haze, and that PET films have higher gloss and transparency.

These experiments show that (1) some additives have little effect on gloss and reduce transparency slightly, (2) some additives produce opacity but decrease gloss greatly, giving the film a poor appearance. In contrast, the oriented film of the invention (e.g. Example 3) made by drawing a film with no additives at 100° C. combines opacity (high haze) with good gloss.

TABLE 3

| experiment | film description | Gloss at 60° (gloss units) | Gloss at 45° (gloss units) | Haze (%) | remarks |
|---|---|---|---|---|---|
| CE D-a | Compression moulded, amorphous PET | 143 | 99 | 4.4 | No additives |
| CE D-b | Transparent bi-axially drawn PET | 169 | 119 | 1.04 | No additives |
| Example 3 | Stress- whitened bi-axially drawn PET | 108 | 77 | 95.2 | Sequentially drawn; no additives |

TABLE 3-continued

| experiment | film description | Gloss at 60° (gloss units) | Gloss at 45° (gloss units) | Haze (%) | remarks |
|---|---|---|---|---|---|
| CE E-a | Compression moulded amorphous PET with ZnO | 130 | 89 | 6.24 | No voiding before drawing |
| CE E-b | Bi-axially drawn PET with ZnO | 80 | 82 | 14.4 | Microscopy shows voiding |
| CE F-a | Compression moulded amorphous PET with nano TiO$_2$ | 136 | 92 | 9.7 | |
| CE F-b | Bi-axially drawn PET with nano TiO$_2$ | 146 | 113 | 3.3 | Microscopy shows no voiding |
| CE G-a | Compression moulded amorphous PET with special mica | 58 | 44 | 99.8 | Two tone colour, no voiding |
| CE G-b | Bi-axially drawn PET with special mica | 63 | 81 | 52.6 | Microscopy shows voiding after stretching |
| CE H-a | Compression moulded amorphous PET with nano silica | 150 | 99 | 4.2 | No voiding before drawing |
| CE H-b | Bi-axially drawn PET with nano silica | 157 | 113 | 2.0 | Microscopy shows no voiding after stretching |
| | Bi-axially oriented PET | 183 | 132 | 1.8 | commercial sample |
| | HDPE | 27 | 15 | 54.2 | commercial sample |
| | LLDPE | 33 | 26 | 24.4 | commercial sample |

The invention claimed is:

1. A process for making an opaque and glossy film from a thermoplastic polyester composition, comprising the steps of
   a) extruding the polyester composition through a slot die, and quenching to form a substantially amorphous film having a crystallinity of at most 5%;
   b) heating the amorphous film to a drawing temperature in the range of from 80 to 95° C. by immersing the film in a liquid heating bath, while applying a draw ratio in the range of 5.1 to 5.7 in longitudinal direction using sets of feed and draw rollers the speed of which can be controlled in such a way that speed fluctuations of at most about 1% occur, and a drawing rate of from about 5 to about 20 m/min to form an oriented film showing stress-whitening; and
   c) heat-setting the oriented stress-whitened film in the range of about 150 to 250° C.;
   wherein the composition is free of barium sulfate;
   wherein the composition is free of pigments, mineral particles, and dispersed incompatible polymers, which act as initiators for voiding,
   wherein the thermoplastic polyester composition comprises 95 mass % or more of at least one crystallisable polyester derived from at least one aliphatic diol and at least one aromatic dicarboxylic acid, and
   wherein the film has a density of 500-1300 kg/m$^3$.

2. The process according to claim 1, wherein the polyester is selected from the group consisting of polyethylene terephthalate, polyethylene naphthalate, and their copolymers.

3. The process according to claim 1, wherein the amorphous film has less than 3% crystallinity.

4. The process according to claim 1, further comprising subsequent to longitudinal drawing a step of applying a draw ratio in transverse direction at a temperature in the range of from $T_g$ to ($T_g$+50° C. to form a bi-axially oriented film, before the heat setting step.

5. The process according to claim 1, further comprising using the opaque oriented polyester film to make finished and semi-finished articles.

6. The process according to claim 5, comprising using the opaque oriented polyester film to make a woven fabric, a rope or a bag.

7. The process according to claim 1, wherein the composition is free of void-inducing additives.

8. The process according to claim 1, wherein the film has a tensile strength of at least 250 MPa.

9. The process according to claim 8, wherein the film has a density of 800-1200 kg/m$^3$ and a tensile strength of at least 300 MPa.

10. The process according to claim 1, wherein the film has a surface gloss at 60° of at least 50 GU and showing a haze value of at least 80%.

* * * * *